Nov. 28, 1972 R. DESSAUER 3,704,127

CO-IRRADIATION METHOD FOR PRODUCING POSITIVE IMAGES UTILIZING PHOTOTROPIC SPIROPYRAN OR INDENONE OXIDE OR DUAL RESPONSE PHOTOSENSITIVE COMPOSITION

Filed Aug. 17, 1970 2 Sheets-Sheet 1

INVENTOR
ROLF DESSAUER
BY
John R. Powell
ATTORNEY

CO-IRRADIATION METHOD FOR PRODUCING POSITIVE IMAGES UTILIZING PHOTOTROPIC SPIROPYRAN OR INDENONE OXIDE OR DUAL RESPONSE PHOTOSENSITIVE COMPOSITION

Filed Aug. 17, 1970 2 Sheets-Sheet 2

INVENTOR
ROLF DESSAUER

BY John R. Powell
ATTORNEY 3,704,127

CO-IRRADIATION METHOD FOR PRODUCING POSITIVE IMAGES UTILIZING PHOTOTROPIC SPIROPYRAN OR INDENONE OXIDE OR DUAL RESPONSE PHOTOSENSITIVE COMPOSITION

Rolf Dessauer, Wilmington, Del., assignor to E. I. du Pont de Nemours and Company, Wilmington, Del.

Continuation-in-part of application Ser. No. 880,301, Nov. 26, 1969. This application Aug. 17, 1970, Ser. No. 64,220
Int. Cl. G03c 5/24
U.S. Cl. 96—48 8 Claims

ABSTRACT OF THE DISCLOSURE

Method for producing positive images by irradiating photosensitive compositions which are characterized by forming color on irradiation with light in a first wavelength range and by being prevented from forming color on irradiation with light in a different second wavelength range. The method comprises simultaneously exposing such composition disposed as an image-capture surface to radiations in both wavelength ranges, with (1) the color-preventing radiation being applied pattern-wise according to the desired image to be captured,
(2) the color-forming radiation being applied over the entire surface to be imaged, and
(3) the intensities and the relative intensities of the two radiations being such that
  (i) the color-preventing radiation is itself effective for color-preventing and
  (ii) the color-forming radiation is itself effective to cause color formation in other than the co-struck areas but is ineffective in the presence of the color-preventing radiation in the co-struck areas to cause substantial color formation.

A prefered composition for use with this method is a mixture of (A) color forming components which are responsive to said first wavelength range and thereby produce a first photo-induced oxidation-reduction reaction, and
(B) deactivating components which are responsive to said second wavelength range and thereby produce a deactivating agent by a second oxidation-reduction reaction, said deactivating agent thus produced being a stronger reducing agent than the reductant member of the color-forming components and thereby preventing the color-forming reaction when the composition is subsequently exposed to the first wavelength range.

Another useful photoimageable system includes photochromic compounds, e.g., the spiropyrans, which form color on being exposed to light of one wavelength range and which revert to the original color on being exposed to light of a second wavelength.

CROSS REFERENCE TO RELATED APPLICATIONS

This application is a continuation-in-part of U.S. Pat. application Ser. No. 880,301, filed Nov. 26, 1969, in the name of Rolf Dessauer and claims benefit of the filing date of said application.

BACKGROUND OF THE INVENTION

(1) Field of the invention

This invention relates to an exposure method and apparatus for producing positive images, i.e. colored images having a relatively light-stable background. More specifically, the invention is directed to such method and apparatus involving photosensitive compositions which are activatable for color formation upon irradiation by light in one range of wavelengths and prevented from forming color upon irradiation by light in another range of wavelengths. The photosensitive composition is exposed so as to yield as a positive reproduction of an original image by subjecting the composition to an overall exposure of the color-forming (imaging) radiation while simultaneously exposing it to a pre-selected pattern of the color-preventing radiation, in a controlled manner. Thus in the preselected pattern areas of the composition the composition is co-irradiated, or co-struck, by both the color-forming radiation and the color-preventing radiation, and in these areas color is prevented from forming.

(2) Description of the prior art

MacLachlan U.S. Pat. 3,390,996, Cescon U.S. Pat. 3,390,994 and Strilko U.S. patent application Ser. No. 740,476, filed June 27, 1968 now U.S. Pat. No. 3,579,-342, all assigned to the assignee herein, disclose light-activatable color forming photosensitive compositions, such as hexaarylbiimidazoles and leuco dyes, which form color upon irradiation with ultraviolet light, and which can be deactivated against such color formation by incorporating therewith light-activatable oxidation-reduction systems, such as a visible light-activatable quinone in combination with a source of abstractable hydrogen such as an aliphatic polyether or an alkyl nitrilotrialkanoate. These compositions will be referred to herein as "photosensitive compositions." Irradiation of such systems with ultraviolet light produces color corresponding to the dye form of the leuco dye component; on the other hand, irradiation with visible light deactivates the color forming components against color formation. Deactivation is attributable to in situ formation of a hydroquinone of the quinone employed, which preferentially reduces photoactivated hexaarylbiimidazole before the biimidazole can oxidize the leuco dye to color.

Phototropic spiropyran systems have been described, for example, in U.S. 3,486,899, 3,485,765, 3,022,318, 2,978,462 2,953,454, Brit. 889,186, Brit. 887,902, and Netherlands 6903746.

Chromophorically unsubstituted spiropirans as illustrated, above are generally nearly colorless compounds in which the pyran ring is intact either as crystalline solids or as solutions in most solvents. These compounds may be changed at will to a colored state, in which the 2′–1′ bond is broken, by subjecting such to light predominating in components from blue to ultraviolet wavelengths, and reversed back, at will, to the substantially colorless state by subjecting such solution to light predominating in components of wavelengths in the green to infrared region of the spectrum.

Another photochromic substance, 2,3-diphenylindenone oxide, has been described by E. F. Ullman and W. A. Henderson, Jr., in "J. Am. Chem. Soc.," 88, 4942 (1966). This compound undergoes reversible photoisomerization to deep red pyrylium oxides.

The above references describe photoimaging and photofixing processes which involve sequentially exposing the photoimageable/photodeactivatable photosensitive compositions to the two radiations, in two distinct steps, with the first applied imagewise, to produce a negative or a positive of the original image, depending on the order of the exposure.

In the above disclosed systems, photo-color prevention is normally much slower than photo-color formation, and is the limiting factor determining the speed with which photosensitive articles involving such compositions can be imaged and fixed. Further, access time to a positive reproduced image is the sum of the time required for the sequential color prevention and color formation steps. In many applications it is desirable to reduce this access time to the final product. It is also desirable to produce dry, hard copy directly and quickly from imaged film, particularly as positive blowback, i.e. a directly readable enlargement from microfilm.

Accordingly it is an object of this invention to provide a simplified singular exposure method and apparatus for producing positive images from the above described prior art photosensitive compositions, especially such a method for producing dry hard copy as positive prints on paper or film directly from positive or negative films, either black or white, or color transparencies and which is adaptable to the blowback (enlargement) of microfilm as a direct print.

SUMMARY OF THE INVENTION

The process of this invention is a process for creating a positive image on a composition which is sensitive to two different radiations and comprises:

(A) a composition which is a responsive to two different wavelength ranges, producing, on being exposed to radiation of the first wavelength range, a first colored state and producing on exposure to radiation of the second wavelength range a second colored (including colorless) state, said composition being further characterized in that it can be prevented from forming color on being simultaneously exposed to radiations within both wavelength ranges;

said process comprising simultaneously exposing the above composition disposed on an image-capture surface to radiation of the first and the second wavelength ranges, said radiation of the first wavelength range being directed to the entire surface to be radiated and being of an intensity effective to cause color formation in areas of said surface other than coirradiated areas but ineffective to cause color formation in areas of said surface that are coirradiated with the radiation of the second wavelength range, said radiation of the second wavelength range being directed patternwise to said surface to be radiated according to the image to be captured and being of an intensity effective to prevent color formation in areas of said surface that are subjected to said second radiation.

In a preferred embodiment of the invention the photosensitive composition comprises a mixture of:

(A) a color-forming component comprising (1) an organic color generator and (2) a photoactivatable first oxidant which can oxidize the color generator to a colored compound on irradiating the said first oxidant with light of a first wavelength range, and (B) a deactivating component comprising (1) a second photoactivatable oxidant which is activatable by light of a second wavelength range, is not an oxidant for the color generator but is reducible when activated by light of said second wavelength range, and (2) a reductant which is a reductant for the second oxidant but not for the first oxidant, said reductant being capable of reducing the second oxidant on irradiation by light of said second wavelength range to a second reductant which is a reductant for the photoactivated first oxidant, whereby the second reductant prevents the color forming reaction between the color generator and the first oxidant.

In another preferred embodiment of the invention the photo-sensitive composition contains a phototropic spiropyran or a phototropic indenone oxide.

The apparatus of this invention provides a system for irradiating the composition defined above and comprises:

(1) means for positioning a photosensitive composition presenting an image-receptive surface prepared from the composition described above, (2) a first photoradiation source and means for directing said photoradiation in a first wavelength in a substantially uniform flux density over the entire surface of the photosensitive composition, (3) a second photoradiation source and means for directing said photoradiation in a second wavelength range in a substantially uniform flux density over the entire surface of the photosensitive composition, (4) a radiation modulating means interposed between the surface of the photosensitive composition and the photoradiation from the second source so as to create a pattern of said photoradiation on said surface, said modulating means containing areas which are essentially transparent to said second radiation and areas which are essentially opaque to said radiation, said first and second radiation sources and directing means and said modulator being positioned with respect to the surface of the photosensitive composition and to each other such that (a) both radiations in the absence of the modulator can irradiate the same total surface area to be imaged, and (b) the modulator screens an image-creating portion of said second radiation without screening the first radiation from the photosensitive surface of said composition.

DESCRIPTION OF THE INVENTION

The term "deactivation" as used herein refers to the prevention of color formation in the photoimageable photodeactivated composition. Deactivation occurs when the composition is subjected to light, as defined, sufficient to render the exposed area of the composition relatively insensitive to color-inducing radiation. The degree of deactivation achieved depends on the intensity of the deactivating radiation and the duration of the exposure. The thus exposed material is "deactivated" or "fixed," with the deactivated area serving as the background against which the color (imaged) area is to be viewed. The background's resistance to form color on subsequent exposure depends in general on the intensity of the color-forming light and the duration of the exposure. Practically speaking, with reference to the preferred compositions used in the invention which are responsive to ultraviolet light (for color formation) and to visible light (for deactivation), the term "deactivated" as used herein means that the composition is rendered practically insensitive to color formation under ordinary use exposures to roomlight, daylight and sunlight, which normally contain ultraviolet components.

The term "color formation," sometimes called image formation herein, refers to the process by which the photosensitive composition is subjected to a light exposure as defined sufficient to produce a colored area visible against the deactivated area.

The term "color-preventing" as used herein includes (1) photodeactivating whereby the color-forming system is rendered substantially inactive towards the color-forming radiation and (2) photoerasing whereby the color that is formed on exposure to the first (color-forming) radiation is erased or bleached, reversibly or irreversibly, on exposure to radiation of the second (color-preventing) wavelength range.

The co-irradiation (i.e., the simultaneous irradiation of certain areas of a surface by both activating and color-preventing radiation) process of this invention affords several new and important results and advantages over the stepwise sequential irradiation process of the prior art. Access time to the final images and fixed product is substantially reduced, largely because the deactivating and color forming radiation exposures are effected simultaneously rather than sequentially, and in part because deactivation by co-irradiation appears to be faster than deactivation by sequential irradiation. Moreover, by using intense deactivating radiation, deactivaton can take place in substantially the same time as the normally photographically faster color formation. Surprisingly, too, co-irradiation produces less color in the deactivated areas than sequential irradiation. Thus, contrast between the colored and deactivated areas appears better than that observed with the same exposure applied sequentially.

Figure 1:
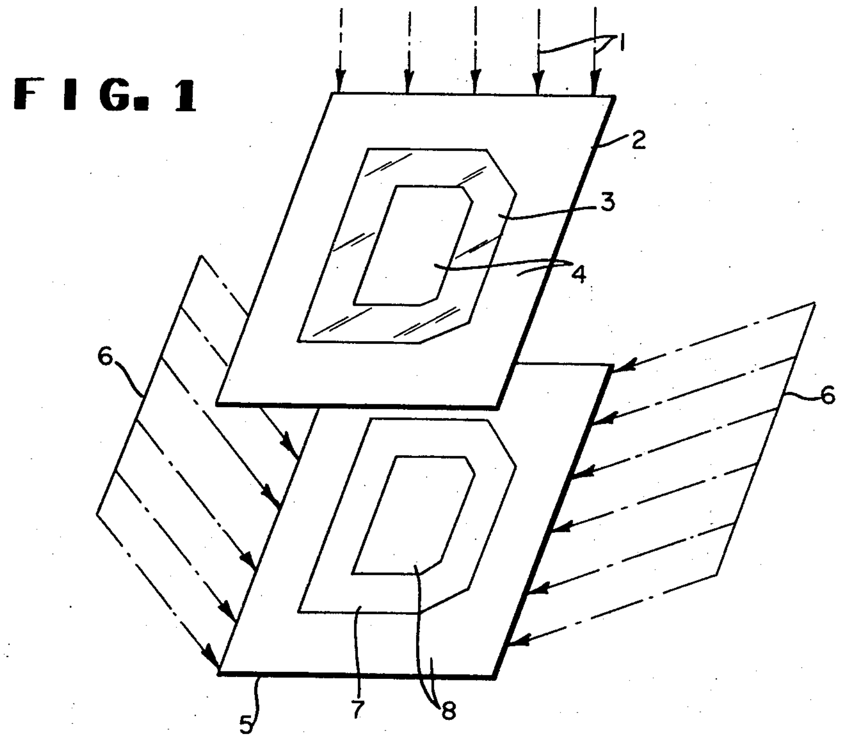
FIG. 1 schematically illustrates the general simultaneous exposure method of the invention for non-reversible fixed image formation.

Referring now to the drawings, FIG. 1 depicts schematically the process of the invention. The figure depicts the passing of deactivating, e.g. visible, light radiation 1 through a pattern-creating light modulator 2, shown in the figure as a stencil having area 3 transparent to light radiation 1 and area 4 opaque to light radiation 1. The radiation 1 passes through area 3 and impinges on the surface 5 of a photoimageable/photodeactivatable composition as defined herein, thereby creating a pattern defined by area 7. Simultaneously color-inducing, e.g. ultraviolet, light radiation 6 is directed over the entire surface 5, including area 7, thereby producing color in area 8 of surface 5 but substantially less or no color in area 7 (which has been simultaneously co-struck by deactivating light radiation 1).

The light sources are pre-selected such that the photosensitive composition's deactivating components are responsive to light 1 and the color-forming components are responsive to light 6 as defined. Positioning of the sources (not shown) of radiations 1 and 6 and the angles at which they strike the surface 5 of the photosensitive composition are not critical provided that (a) the deactivating radiation passes through modulator 2 before it strikes surface 5, forming deactivated area 7, and (b) the color-inducing radiation can strike the entire surface 5 area. Preferably the light sources are positioned such that the deactivating and color-forming radiations can be uniformly distributed over the photosensitive surface 5 according to the indicated patterns.

The intensities of the deactivating (the second wavelength range) and color-forming radiations (first wavelength range) 1 and 6 respectively, and the exposure times are chosen such that color is produced in area 8 with substantially little or no color in co-struck area 7. To maximize speed and shorten access time to the reproduced image, the deactivating radiation can be as intense as feasible, consistent with the stability of the materials involved to such radiation. Given a particular deactivating light radiation exposure, the color-forming light radiation exposure can be varied, depending on the relative deactivation and color formation rates of the particular photosensitive composition involved and on the effect desired. The color-forming radiation should be sufficiently intense of course to produce readout, i.e., visible, amounts of color in the desired areas (8) but not so intense as to cause substantial color formation in the co-struck area (7) and interfere with image contrast and readout. A key feature of this invention is that the color-inducing radiation intensity is readily controlled so as to produce substantially little or no color in the co-struck deactivated areas. Surprisingly, in fact, co-irradiation produces images with better backgrounds and consequently better contrast than the sequential positive imaging process involving the same exposure conditions but patternwise irradiation first with deactivating light followed by an overall exposure with color forming light.

It will be noted that FIG. 1 shows light modulator 2 and photosensitive surface 5 as substantially parallel planes spaced apart to permit flooding of surface 5 with color-inducing radiation 6. Where it is possible to expose the surface 5 to color-inducing radiation without interference from the modulator, there is no need to space surface 5 apart from modulator 2. For example, where areas 3 and 4, that is, the entire modulator 2 are transparent to color-forming light 6, surface 5 can be simultaneously irradiated from the same direction, as in contact printing, with both radiations 1 and 6 through modulator 2 produce a fixed image in one step. As a further example where the photosensitive composition is disposed as a thin layer coating on a substrate (film, quartz or glass) that is essentially transparent to color-inducing wavelengths, the photosensitive composition can be placed between the modulator 2 and the color-inducing light source 6. In other words the deactivating and colorforming radiations can be simultaneously applied from opposite directions.

Figures 2, 3:
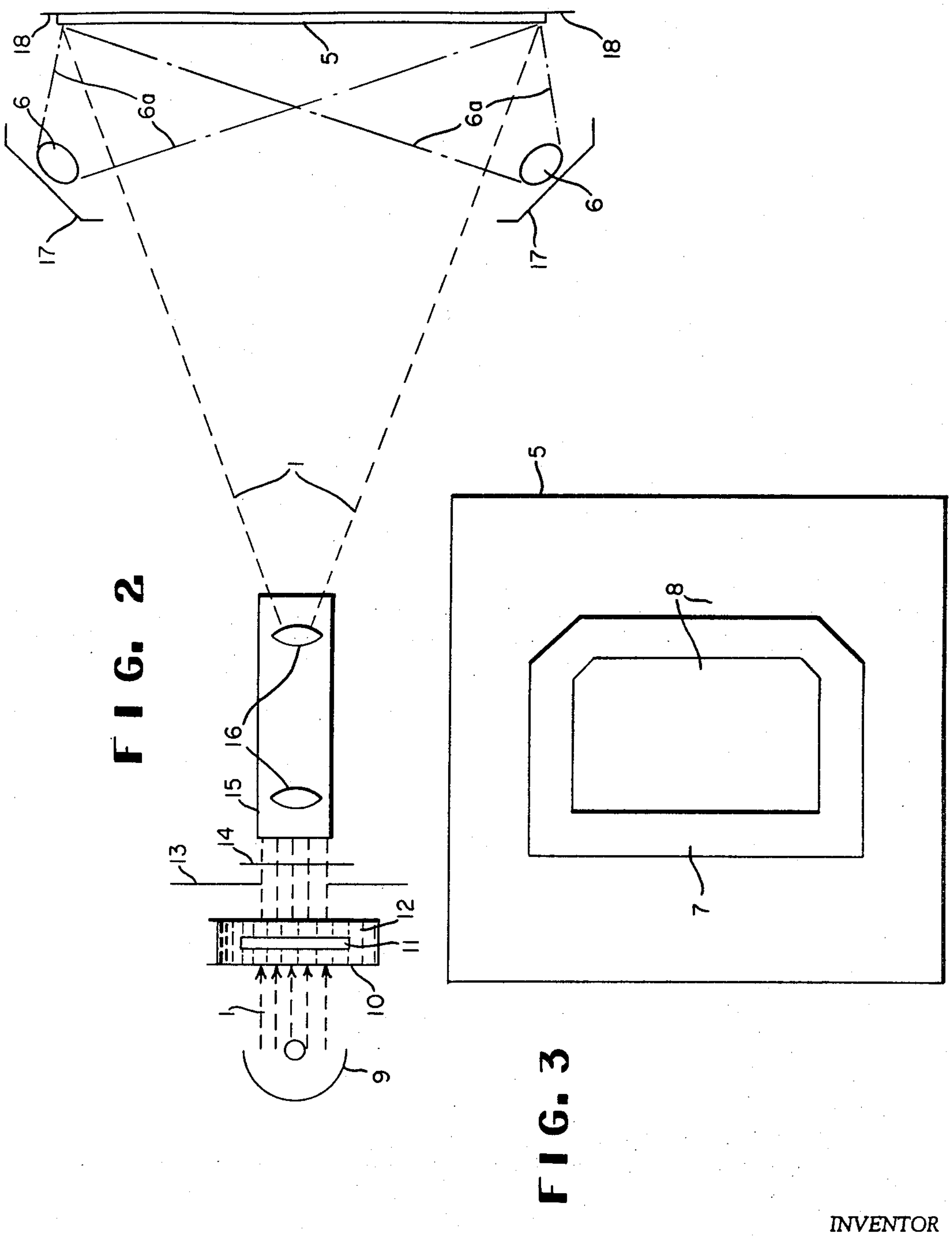
FIG. 2 illustrates a projection enlargement device embodying the principal features of the FIG. 1 invention scheme and particularly adapted for blowback of microfilm as hard copy.
FIG. 3 shows a full-face view of a projected, enlarged image developed and fixed by simultaneous imaging and fixing according to the invention method.

FIGS. 2 and 3 illustrate a microfilm blowback device embodying the principal features of the invention process. FIG. 2 shows a side view of the overall system, while FIG. 3 shows a full face view of the projected image. The system includes projection lamp 9 (the source of deactivating light 1 of the figure); an air-cooled filter cell 10, containing light filter 11 in light-transparent infrared absorbing medium 12 (e.g., water); film gate 13; microfilm 14 (serving as the modulator 2 of FIG. 1) bearing the image to be blown back and reproduced as hard copy; projection lens assembly 15 including lenses 16, for projecting the film 14 image as an enlargement onto viewing screen 18 which is coated on surface 5 with the photosensitive image-capture material or which serves as a background for coated film or paper; color-inducing radiation sources 6, with reflectors 17, to direct a flood of light 6_a_ over surface 5.

Screen 18 which may function as a viewing screen and a mechanical support for the coating of the photosensitive composition to present image-capture surface 5, is normally disposed such that the viewing (recording) plane is perpendicular to the directional axis of the patternwise projected deactivating light 1. Light sources 6 with reflectors 17 are positioned just outside the path of deactivating light 1 and are sized with respect to one another such that the light 6_a_ irradiating from source 6 is substantially uniform over surface 5.

Filter cell 10 is designed primarily to prevent film 14 from overheating (melting) and to screen out "unusable" radiation i.e. radiation other than radiation that the photosensitive composition can absorb and utilize in the deactivating process. The cell also serves to minimize the quantity of heat absorbed by the film. For example, in a preferred embodiment which involves projecting of a microfilm image with relatively intense blue light, a filter is employed which passes such blue light. Also, the filter is cooled by immersion in water. Other light filters and compatible heat-absorbing media may be employed, of course, depending on the particular photoimageable/photodeactivatable composition used and the sensitivity of the light modulator to heat. For example dichroic mirrors used either in the transmission or reflection mode may be substituted or used in addition to filter cell 10.

Figure 4:
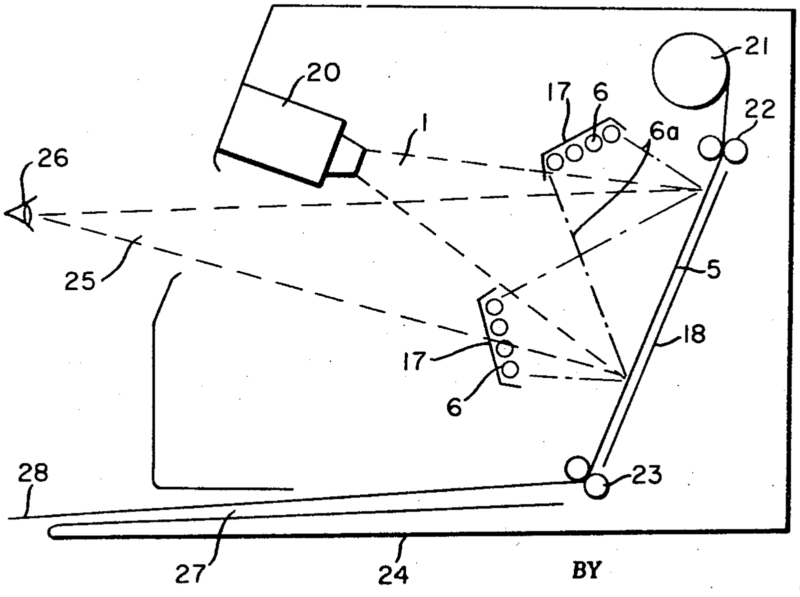
FIG. 4 is a novel viewer-printer, for microfilm viewing and blowback hard copy generation, which incorporates the system of FIGS. 2 and 3 and provides for positive viewing of the image to be copied in high ambient light and for simultaneous viewing and hard copy generation.

The viewer-printer of FIG. 4 comprises projector 20 (which contains elements 9 through 16 of FIG. 2) batteries of lamps 6 with reflectors 17; viewing screen 18; roll stock 21, which supplies paper or film carrying a surface coating 5 of a photosensitive composition as described herein; roll stock feed mechanism 22; eject mechanism 23; housing 24 with viewing tunnel 25 allowing some ambient visible light (e.g. daylight, artificial roomlight) to enter the housing sufficient to provide visual access to screen 19 by viewer 26; and exit slot 27 for hard copy 28 i.e. photoimaged and photo-fixed composition paper or film. Feed mechanism 22 can be provided with a cutting means to deliver copy 28 as individual sheets (enlarged film frames) instead of a continuous printout.

A viewer-printer similar to that shown in FIG. 4 may be provided with separate viewing and printing stations, and the projected beam 1 directed to either one or the other by the insertion, removal, or rotation of suitably placed mirrors. In such a device, the printing station can be shielded completely from room light so that the image-receiving paper may be left in place on the printing platen until exposure is desired. Furthermore, viewing can be carried out on a rear-projection screen, which has the advantage of allowing closer inspection than does a reflective screen.

In the viewer-printer in which the viewing and printing stations are separated, a dichroic mirror may be placed in the projected beam so that only those wavelengths of light effective in causing deactivation are directed to the printing station while other visible wavelengths are at the same time directed to the viewing screen. In such a device, it would then be possible to view and print simultaneously.

It will be apparent from the above that the coirradiation method coupled with the photosensitive compositions herein defined provides a consistent "positive" systems for microfilm duplication and blowback. Because co-irradiation produces positive images, i.e. duplicates the master exactly, it is directly applicable to positive, i.e. "black on white," microfilm, and yields positive visual blowback and positive hard copy. In duplicating film directly, it eliminates the prior art need to first convert the original negative into a duplicate positive for subsequent duplication of negative microfilm which is the form normally distributed for use.

As previously stated, the degree of deactivation obtained in one composition depends on the intensity of the deactivating radiation and the duration of the exposure. By reducing one or the other, so-called "partial deactivation" can be obtained. In other words, by reducing the amount of deactivating radiation in the process, an imaged, but partially deactivated composition can be obtained. Information can then be "added on" by subjecting the partially deactivated area to a patternwise (information stencil) beam of imaging radiation.

THE PHOTOSENSITIVE COMPOSITION EMPLOYED

As described above in the summary, a preferred composition for use with this invention comprises a color-forming component and a deactivating component.

The color-forming component comprises a color generator and a first photoactivatable oxidant.

The first photoactivatable oxidant is preferably a 2,2',4,4',5,5'-hexaarylbiimidazole, sometimes called a 2,4,5-triarylimidazolyl dimer. They are photodissociable to the corresponding triarylimidazolyl radicals. These hexaarylbiimidazoles absorb maximally in the 255–275 mμ region, and usually show some, though lesser absorption in the 300–375 mμ region. Although the absorption bands tend to tail out to include wavelengths as high as about 420 mμ, they thus normally require light rich in the 255–375 mμ wavelengths for their dissociation. Thus the radiation of the first wavelength range used in the process of this invention is ultraviolet light.

The hexaarylbiimidazoles can be represented by the formula

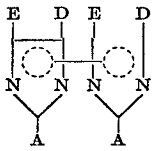

wherein A, E and D represent aryl groups which can be the same or different, carbocyclic or heterocyclic, unsubstituted or substituted with substituents that do not interfere with the dissociation of the hexaarylbiimidazole to the triarylimidazolyl radical or with the oxidation of the leuco dye, and each dotted circle stands for four delocalized electrons (i.e., two conjugated double bonds) which satisfy the valences of the carbon and nitrogen atoms of the imidazolyl ring. The E and D aryl groups can each be substituted with 0–3 substituents and the A aryl groups can be substituted with 0–4 substituents.

The aryl groups include one- and two-ring aryls, such as phenyl, biphenyl, naphthyl, pyridyl, furyl and thienyl. Suitable inert (i.e., non-interfering with the processes described herein) substituents on the aryl groups have Hammett sigma (para) values in the −.5 to 0.8 range, and are other than hydroxyl, sulfhydryl, amino, alkylamino or dialkylamino groups. Representative substituents and their sigma values, (relative to H=.00), as given by Jaffe, Chem. Rev. 53, 219–233 (1953) are: methyl (−0.17), ethyl (−0.15), t-butyl (−0.20), phenyl (0.01), butoxy (−0.32), phenoxy (−0.03), fluoro (0.06), chloro (0.23), bromo (0.23), iodo (0.28), methylthio (−0.05), nitro (0.78), ethoxycarbonyl (0.52), and cyano (0.63). The foregoing substituents are preferred; however, other substituents which can be employed include trifluoromethyl (0.55), chloromethyl (0.18), carboxyl (0.27), cyanomethyl (0.01), 2-carboxyethyl (−0.07), and methylsulfonyl (0.73). Thus, the substituents can be halogen, cyano, lower hydrocarbyl (including alkyl, halo alkyl, cyanoalkyl, hydroxyalkyl and aryl), lower alkoxy, aryloxy, lower alkylthio, arylthio, sulfo, alkyl sulfonyl, arylsulfonyl, and nitro, and lower alkylcarbonyl. In the foregoing list, alkyl groups referred to therein are preferably of 1–6 carbon atoms; while aryl groups referred to therein are preferably of 6–10 carbon atoms.

Preferably the aryl radicals are carbocyclic, particularly phenyl, and the substituents have Hammett sigma values in the range −.4 to +.4, particularly lower alkyl, lower alkoxy, chloro, fluoro, bromo and benzo groups.

In a preferred hexaarylbiimidazole class, the 2 and 2' aryl groups are phenyl rings bearing an ortho substituent having a Hammett sigma value in the range −.4 to +.4. Preferred ortho substituents are fluorine, chlorine, bromine, methyl and methoxy groups, especially chloro. Such biimidazoles tend less than others to form color when the light-sensitive compositions are applied to and dried on substrates at somewhat elevated temperatures, e.g., in the range 70–100° C.

Most preferably, the 2-phenyl ring carries only the above-described ortho group, and the 4- and 5-phenyl rings are either unsubstituted or substituted with lower alkoxy.

Preferred hexaarylbiimidazoles include 2,2'-bis(o-chlorophenyl)-4,4',5,5'-tetraphenylbiimidazole and 2,2'-bis(o-chlorophenyl) - 4,4',5,5' - (m - methoxyphenyl) biimidazole.

Representative hexaarylbiimidazoles which can be employed in this invention include:

2,2'-bis(o-bromophenyl)-4,4',5,5'-tetraphenylbiimidazole, 2,2'-bis(p-bromophenyl)-4,4',5,5'-tetraphenylbiimidazole, 2,2'-bis(p-carboxyphenyl)-4,4',5,5'-tetraphenylbiimidazole, 2,2'-bis(o-chlorophenyl)-4,4',5,5'-tetrakis(p-methoxyphenyl)biimidazole, 2,2′-bis(o-chlorophenyl)-4,4′,5,5′-tetraphenylbiimidazole,
2,2′-bis(p-chlorophenyl)-4,4′,5,5′-tetrakis(p-methoxyphenyl)biimidazole,
2,2′-bis(p-cyanophenyl)-4,4′,5,5′-tetrakis(p-methoxyphenyl)biimidazole,
2,2′-bis(2,4-dichlorophenyl)-4,4′,5,5′-tetraphenylbiimidazole,
2,2′-bis(2,4-dimethoxyphenyl)-4,4′,5,5′-tetraphenylbiimidazole,
2,2′-bis(o-ethoxyphenyl)-4,4′,5,5′-tetraphenylbiimidazole,
2,2′-bis(m-fluorophenyl)-4,4′,5,5′-tetraphenylbiimidazole,
2,2′-bis(o-fluorophenyl)-4,4′,5,5′-tetraphenylbiimidazole,
2,2′-bis(p-fluorophenyl)-4,4′,5,5′-tetraphenylbiimidazole,
2,2′-bis(o-n-hexyloxyphenyl)-4,4′,5,5′-tetraphenylbiimidazole,
2,2′-bis(o-n-hexylphenyl)-4,4′,5,5′-tetrakis(p-methoxyphenyl)biimidazole,
2,2′-bis(3,4-methylenedioxyphenyl)-4,4′,5,5′-tetraphenylbiimidazole,
2,2′-bis(o-chlorophenyl)-4,4′,5,5′-tetrakis(m-methoxyphenyl)biimidazole,
2,2′-bis(o-chlorophenyl)-4,4′,5,5′-tetrakis[m-(betaphenoxyethoxyphenyl)]biimidazole,
2,2′-bis(2,6-dichlorophenyl)-4,4′,5,5′-tetraphenylbiimidazole,
2,2′-bis(o-methoxyphenyl)-4,4′,5,5′-tetraphenylbiimidazole,
2,2′-bis(p-methoxyphenyl)-4,4′,5,5′-bis(o-methoxyphenyl)-5,5′-diphenylbiimidazole,
2,2′-bis(o-nitrophenyl)-4,4′,5,5′-tetraphenylbiimidazole,
2,2′-bis(p-phenylsulfonylphenyl)-4,4′,5,5′-tetraphenylbiimidazole,
2,2′-bis(p-sulfamoylphenyl)-4,4′,5,5′-tetraphenylbiimidazole,
2,2′-bis(2,4,6-trimethylphenyl)-4,4′,5,5′-tetraphenylbiimidazole,
2,2′-di-4-biphenylyl-4,4′,5,5′-tetraphenylbiimidazole,
2,2′-di-1-naphthyl-4,4′,5,5′-tetrakis(p-methoxyphenyl)biimidazole,
2,2′-di-9-phenanthryl-4,4′,5,5′-tetrakis(p-methoxyphenyl)biimidazole,
2,2′-diphenyl-4,4′,5,5′-tetra-4-biphenylbiimidazole,
2,2′-diphenyl-4,4′,5,5′-tetra-2,4-xylylbiimidazole,
2,2′-di-3-pyridyl-4,4′,5,5′-tetraphenylbiimidazole,
2,2′-di-3-thienyl-4,4′,5,5′-tetraphenylbiimidazole
2,2′-di-o-tolyl-4,4′5,5′-tetraphenylbiimidazole,
2,2′-di-p-tolyl-4,4′-di-o-tolyl-5,5′-diphenylbiimidazole,
2,2′-di-2,4-xylyl-4,4′,5,5′-tetraphenylbiimidazole,
2,2′,4,4′,5,5′-hexakis(p-benzylthiophenyl)biimidazole,
2,2′,4,4′,5,5′-hexa-1-naphthylbiimidazole,
2,2′,4,4′,5,5′-hexaphenylbiimidazole,
2,2′-bis(2-nitro-5-methoxyphenyl)-4,4′,5,5′-tetraphenylbiimidazole, and
2,2′-bis(o-nitrophenyl)-4,4′,5,5′-tetrakis(m-methoxyphenylbiimidazole,
2,2′-bis(2-chloro-5-sulfophenyl)-4,4′,5,5′-tetraphenylbiimidazole, The hexaarylbiimidazoles are conveniently obtained by known methods as more particularly described by British Pat. 997,396 and by Hayashi et al., Bull. Chem. Soc. Japan, 33, 565 (1960) and Cescon & Dessauer U.S. Pat. 3,445,234. The preferred method, involving oxidative dimerization of the corresponding triarylimidazole with ferricyanide in alkali, generally yields the 1,2′-hexaarylbiimidazoles, although other isomers, such as the 1,1′, 1,4′,2,2′,2,4′ and 4,4′-hexaarylbiimidazoles are sometimes also obtained admixed with the 1,2′-isomer. For the purposes of this invention, it is immaterial which isomer is employed so long as it is photodissociable to the triarylimidazolyl radical, as discussed above.

The color generator is preferably a leuco dye. By the term "leuco dye" is meant the colorless (i.e., the reduced) form of a dye compound which can be oxidized to its colored form by the triarylimidazolyl radical.

Leuco dyes which can be oxidized to color by the triarylimidazolyl radicals generated from the compositions of this invention include: aminotriarylmethanes, aminoxanthenes, aminothioxanthenes, amino-9,10-dihydroacridines, aminophenoxazines, aminophenothiazines, aminodihydrophenazines, aminodiphenylmethanes, leuco indamines, aminohydrocinnamic acids (cyanoethanes, leuco methines), hydrazines, leuco indigoid dyes, amino-2,3-dihydroanthraquinones, tetrahalo-p,p′-biphenols, 2-(p-hydroxyphenyl)-4,5 - diphenylimidazoles, phenylethylanilines, and the like. These classes of leuco dyes are described in greater detail in Cescon & Dessauer U.S. Pat. 3,445,234; Cescon, Dessauer & Looney U.S. Pat. 3,423,427; Cescon, Dessauer & Looney U.S. Pat. 3,449,-379; Read U.S. Pat. 3,395,018 and Read U.S. Pat. 3,390,997.

The preferred leucos are the aminotriarylmethanes. Preferably the aminotriarylmethane is one wherein at least two of the aryl groups are phenyl groups having (a) an $R_1R_2N$-substituent in the position para to the bond to the methane carbon atom wherein $R_1$ and $R_2$ are each groups selected from hydrogen, $C_1$ to $C_{10}$ alkyl, 2-hydroxyethyl, 2-cyanoethyl, benzyl or phenyl, and (b) a group ortho to the bond to the methane carbon atom which is selected from lower alkyl, lower alkoxy, fluorine, chlorine, bromine, or butadienylene which when joined to the phenyl group forms a naphthalene ring; and the third aryl group, when different from the first two, is selected from thienyl, furyl, oxazylyl, pyridyl, thiazolyl, indolyl, indolinyl, benzoxazolyl, quinolyl, benzothiazolyl, phenyl, naphthyl, or such afore-listed groups substituted with lower alkyl, lower alkoxy, methylenedioxy, fluoro, chloro, bromo, amino, lower alkylamino, lower dialkylamino, lower alkylthio, hydroxy, carboxy, carbonamido, lower carbalkoxy, lower alkylsulfonyl, lower alkylsulfonamido, $C_6$ to $C_{10}$ arylsulfonamido, nitro or benzylthio. Preferably the third aryl group is the same as the first two.

Particularly preferred aminotriarylmethanes have the following structural formula:

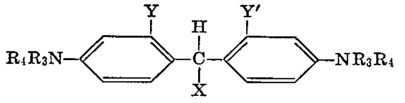

wherein $R_3$ and $R_4$ are lower alkyl (preferably ethyl) or benzyl;
Y and Y′ are lower alkyl (preferably methyl); and
X is p-methoxyphenyl, 2-thienyl, phenyl, 1-naphthyl, 2,3-dimethoxyphenyl, 3,4-methylene dioxyphenyl, p-benzylthiophenyl or

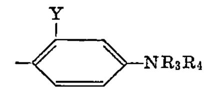

wherein Y, $R_3$ and $R_4$ are as defined above.

Preferably X is phenyl, 1-naphthyl, p-benzylthiophenyl or

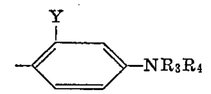

These triarylmethanes are employed as salts of strong acids: for example, mineral acids such as hydrochloric, hydrobromic, sulfuric, nitric, phosphoric; organic acids such as acetic, oxalic, p-toluenesulfonic, trichloroacetic acid, trifluoroacetic acid, perfluoroheptanoic acid; and Lewis acids such as zinc chloride, zinc bromide, and ferric chloride; the proportion of acid usually varying from 1 to 20 moles per mole of leuco dye, preferably 4 to 10 moles per mole. The term "strong acid" as used herein is defined as an acid which forms a salt with an anilino amino group.

Specific examples of the aminotriarylmethanes employed in this invention are:

bis(4-amino-2-butylphenyl)(p-dimethylaminophenyl) methane
bis(4-amino-2-chlorophenyl)(p-aminophenyl)methane
bis(4-amino-3-chlorophenyl)(o-chlorophenyl)methane
bis(4-amino-3-chlorophenyl)phenylmethane
bis(4-amino-3,5-diethylphenyl)(o-chlorophenyl) methane
bis(4-amino-3,5-diethylphenyl)(o-ethoxyphenyl) methane
bis(4-amino-3,5-diethylphenyl)(p-methoxyphenyl) methane
bis(4-amino-3,5-diethylphenyl)phenylmethane
bis(4-amino-3-ethylphenyl)(o-chlorophenyl)methane
bis(p-aminophenyl)(4-amino-m-tolyl)methane
bis(p-aminophenyl)(o-chlorophenyl)methane
bis(p-aminophenyl)(p-chlorophenyl)methane
bis(p-aminophenyl)(2,4-dichlorophenyl)methane
bis(p-aminophenyl)(2,5-dichlorophenyl)methane
bis(p-aminophenyl)(2,6-dichlorophenyl)methane
bis(p-aminophenyl)phenylmethane
bis(4-amino-o-tolyl)(p-chlorophenyl)methane
bis(4-amino-o-tolyl)(2,4-dichlorophenyl)methane
bis(p-anilinophenyl)(4-amino-m-tolyl)methane
bis(4-benzylamino-2-cyanophenyl)(p-aminophenyl) methane
bis(p-benzylethylaminophenyl)(p-chlorophenyl) methane
bis(p-benzylethylaminophenyl)(p-diethylaminophenyl) methane
bis(p-benzylethylaminophenyl)(p-dimethylaminophenyl) methane
bis(4-benzylethylamino-o-tolyl)(p-methoxyphenyl) methane
bis(p-benzylethylaminophenyl)phenylmethane
bis(4-benzylethylamino-o-tolyl)(o-chlorophenyl) methane
bis(4-benzylethylamino-o-tolyl)(p-diethylaminophenyl) methane
bis(4-benzylethylamino-o-tolyl)(4-diethylamino-o-tolyl) methane
bis(4-benzylethylamino-o-tolyl)(p-dimethylaminophenyl) methane
bis[2-chloro-4-(2-diethylaminoethyl)ethylaminophenyl] (o-chlorophenyl)methane
bis[p-bis(2-cyanoethyl)aminophenyl]phenylmethane
bis[p-(2-cyanoethyl)ethylamino-o-tolyl](p-dimethylaminophenyl)methane
bis[p-(2-cyanoethyl)methylaminophenyl](p-diethylaminophenyl)methane
bis(p-dibutylaminophenyl)[p-(2-cyanoethyl)methylaminophenyl]methane
bis(p-dibutylaminophenyl)(p-diethylaminophenyl) methane
bis(4-diethylamino-2-butoxyphenyl)(p-diethylaminophenyl)methane
bis(4-diethylamino-2-fluorophenyl)o-tolylmethane
bis(p-diethylaminophenyl)(p-aminophenyl)methane
bis(p-diethylaminophenyl)(4-anilino-1-naphthyl) methane
bis(p-diethylaminophenyl)(m-butoxyphenyl)methane
bis(p-diethylaminophenyl)(o-chlorophenyl)methane
bis(p-diethylaminophenyl)(p-cyanophenyl)methane
bis(p-diethylaminophenyl)(2,4-dichlorophenyl)methane
bis(p-diethylaminophenyl)(4-diethylamino-1-naphthyl) methane
bis(p-diethylaminophenyl)(p-dimethylaminophenyl) methane
bis(p-diethylaminophenyl)(4-ethylamino-1-naphthyl) methane bis(p-diethylaminophenyl)2-naphthylmethane
bis(p-diethylaminophenyl)(p-nitrophenyl)methane
bis(p-diethylaminophenyl)2-pyridylmethane
bis(p-diethylamino-m-tolyl)(p-diethylaminophenyl) methane
bis(4-diethylamino-o-tolyl)(o-chlorophenyl)methane
bis(4-diethylamino-o-tolyl)(p-diethylaminophenyl) methane
bis(4-diethylamino-o-tolyl)(p-diphenylaminophenyl) methane
bis(4-diethylamino-o-tolyl)phenylmethane
bis(4-dimethylamino-2-bromophenyl)phenylmethane
bis(p-dimethylaminophenyl)(4-anilino-1-naphthyl) methane
bis(p-dimethylaminophenyl)(p-sec.-butylethylaminophenyl)methane
bis(p-dimethylaminophenyl)(p-chlorophenyl)methane
bis(p-dimethylaminophenyl)(p-diethylaminophenyl) methane
bis(p-dimethylaminophenyl)(4-dimethylamino-1-naphthyl)methane
bis(p-dimethylaminophenyl)(6-dimethylamino-m-tolyl) methane
bis(p-dimethylaminophenyl)(4-dimethylamino-o-tolyl) methane
bis(p-dimethylaminophenyl)(4-ethylamino-1-naphthyl) methane
bis(p-dimethylaminophenyl)(p-hexyloxyphenyl) methane
bis(p-dimethylaminophenyl)(p-methoxyphenyl)methane
bis(p-dimethylaminophenyl)(5-methyl-2-pyridyl) methane
bis(p-dimethylaminophenyl)2-quinolylmethane
bis(p-dimethylaminophenyl)o-tolylmethane
bis(p-dimethylaminophenyl)(1,3,3-trimethyl-2-indolinylidenemethyl)methane
bis(4-dimethylamino-o-tolyl)(p-aminophenyl)methane
bis(4-dimethylamino-o-tolyl)(o-bromophenyl)methane
bis(4-dimethylamino-o-tolyl)(o-cyanophenyl)methane
bis(4-dimethylamino-o-tolyl)(o-fluorophenyl)methane
bis(4-dimethylamino-o-tolyl)1-naphthylmethane
bis(4-dimethylamino-o-tolyl)phenylmethane
bis(p-ethylaminophenyl)(o-chlorophenyl)methane
bis(4-ethylamino-m-tolyl)(o-methoxyphenyl)methane
bis(4-ethylamino-m-tolyl)(p-methoxyphenyl)methane
bis(4-ethylamino-m-tolyl)(p-dimethylaminophenyl) methane
bis(4-ethylamino-m-tolyl)(p-hydroxyphenyl)methane
bis[4-ethyl(2-hydroxyethyl)amino-m-tolyl](p-diethylaminophenyl)methane
bis[p-(2-hydroxyethyl)aminophenyl](o-chlorophenyl) methane
bis[p-bis(2-hydroxyethyl)aminophenyl](4-diethylamino-o-tolyl)methane
bis[p-(2-methoxyethyl)aminophenyl]phenylmethane
bis(p-methylaminophenyl)(o-hydroxyphenyl)methane
bis(p-propylaminophenyl)(m-bromophenyl)methane
tris(4-amino-o-tolyl)methane
tris(4-anilino-o-tolyl)methane
tris(p-benzylaminophenyl)methane
tris[4-bis(2-cyanoethyl)amino-o-tolyl]methane
tris[p-(2-cyanoethyl)ethylaminophenyl]methane
tris(p-dibutylaminophenyl)methane
tris(p-di-n-butylaminophenyl)methane
tris(4-diethylamino-2-chlorophenyl)methane
tris(p-diethylaminophenyl)methane
tris(4-diethylamino-o-tolyl)methane
tris(p-dihexylamino-o-tolyl)methane
tris(4-dimethylamino-o-tolyl)methane
tris(p-hexylaminophenyl)methane
tris[p-bis(2-hydroxyethyl)aminophenyl]methane
tris(p-methylaminophenyl)methane
tris(p-dioctadecylaminophenyl)methane
tris(4-diethylamino-2-fluorophenyl)methane
tris(4-dimethylamino-2-fluorophenyl)methane bis(2-bromo-4-diethylaminophenyl)phenylmethane,
bis(2-butoxy-4-diethylaminophenyl)phenylmethane,
bis(4-diethylamino-o-tolyl)(p-methoxyphenyl)methane,
bis(4-diethylamino-2-methoxyphenyl)(p-nitrophenyl) methane,
bis(4-diethylamino-1-naphthyl)(4-diethylamino-o-tolyl) methane,
bis(4-diethylamino-o-tolyl)1-naphthylmethane,
bis(4-diethylamino-o-tolyl)phenylmethane,
tris(4-dimethylamino-2-chlorophenyl)methane,
bis(4-dimethylamino-2,5-dimethylphenyl)phenylmethane,
bis(4-dimethylamino-o-tolyl)(o-bromophenyl)methane,
bis(4-ethylbenzylamino-o-tolyl)(p-methoxyphenyl) methane,
tris(p-dioctylamino-o-tolyl)methane,
bis(4-diethylamino-o-tolyl)(4-methoxy-1-naphthyl) methane
bis(4-diethylamino-o-tolyl)(3,4,5-trimethoxyphenyl) methane
bis(4-diethylamino-o-tolyl)(p-hydroxyphenyl)methane
5-[bis(4-diethylamino-o-tolyl)-methyl]-2,3-cresotic acid
4-[bis(4-diethylamino-o-tolyl)-methyl]-phenol
4-[bis(4diethylamino-o-tolyl)-methyl]-acetanilide
4-[bis(4-diethylamino-o-tolyl)-methyl]-phenylacetate
4-[bis(4-diethylamino-o-tolyl)methyl]benzoic acid
4-[bis(4-diethylamino-o-tolyl)-methyl]-diphenyl sulfone
4-[bis(4-diethylamino-o-tolyl)-methyl]phenylmethyl sulfone
4-[bis(4-diethylamino-o-tolyl)-methyl]-methylsulfonanilide
4-[bis(4-diethylamino-o-tolyl)-methyl]-p-tolylsulfonanilide
bis(4-diethylamino-o-tolyl)(p-nitrophenyl)methane
bis(4-diethylamino-o-tolyl)(2-diethylamino-4-methyl-5-thiazolyl) methane
bis(4-diethylamino-o-tolyl)(2-diethylamino-5-methyl-6-benzoxazolyl)methane
bis(4-diethylamino-o-tolyl)(2-diethylamino-5-methyl-6-benzothiazolyl)methane
bis(4-diethylamino-o-tolyl)(1-ethyl-2methyl-3-indolyl) methane
bis(4-diethylamino-o-tolyl)(1-benzyl-2-methyl-3-indolyl) methane
bis(4-diethylamino-o-tolyl)(1-ethyl-2-methyl-3-indolyl) 3-indolyl)methane
bis(1-o-xylyl-2-methyl-3-indolyl)(4-diethylamino-o-tolyl)methane
bis(4-diethylamino-o-tolyl)(1-ethyl-5-indolinyl)methane
bis(1-isobutyl-6-methyl-5-indolinyl)(4-diethylamino-o-tolyl)methane
bis(4-diethylamino-o-tolyl)(8-methyl-9-julolindinyl) methane
bis(4-diethylamino-2-acetamidophenyl)(4-diethylamino-o-tolyl)methane
4-[bis(4-diethylamino-o-tolyl)methyl]-N-ethylacetanilide
bis[4-(1-phenyl-2,3-dimethyl-5-pyrazolinyl)](4-diethylamino-o-tolyl)methane
bis(4-diethylamino-o-tolyl)(7-diethylamino-4-methyl-3-coumarinyl)methane
bis(4-diethylamino-o-tolyl)(4-acrylamidophenyl) methane
bis(4-diethylamino-o-tolyl)(p-benzylthiophenyl) methane
bis(4-diethylamino-o-tolyl)(4-isopropylthio-3-methylphenyl)methane
bis(4-diethylamino-o-tolyl)(4-chlorobenzylthiophenyl) methane
bis(4-diethylamino-o-tolyl)(2-furyl)methane
bis(4-diethylamino-o-tolyl)(3,4-methylenedioxyphenyl) methane
bis(4-diethylamino-o-tolyl)(3,4-dimethoxyphenyl) methane
bis(4-diethylamino-o-tolyl)(3-methyl-2-thienyl)methane
bis(4-diethylamino-o-tolyl)(2,4-dimethoxyphenyl) methane
bis[4-(2-cyanoethyl)(2-hydroxyethyl)amino-o-tolyl]-(p-benzylthiophenyl)methane,
bis[4-(2-cyanoethyl)(2-hydroxyethyl)amino-o-tolyl]-2-thienylmethane,
bis(4-dibutylamino-o-tolyl)-2-thienylmethane,
bis(4-diethylamino-2-ethylphenyl)(3,4-methylenedioxyphenyl)methane,
bis(4-diethylamino-2-fluorophenyl)(p-benzylthiophenyl) methane,
bis(4-diethylamino-2-fluorophenyl)(3,4-methylenedioxyphenyl)methane,
bis(4-diethylamino-o-tolyl)p-methylthiophenyl) methane,
bis(4-diethylamino-o-tolyl)2-thienylmethane,
bis(4-dimethylamino-2-hexylphenyl)(p-butylthiophenyl) methane,
bis[4-(N-ethylanilino)-o-tolyl](3,4-dibutoxyphenyl) methane,
bis[4-bis(2-hydroxyyethyl)amino-2-fluorophenyl](p-benzylthiophenyl)methane,
bis(4-diethylamino-o-tolyl)(p-chlorophenyl)methane,
bis(4-diethylamino-o-tolyl)(p-bromophenyl)methane,
bis(4-diethylamino-o-tolyl)(p-fluorophenyl)methane,
bis(4-diethylamino-o-tolyl)p-tolylmethyl,
bis(4-diethylamino-o-tolyl)(4-methoxy-1-naphthyl) methane,
bis(4-diethylamino-o-tolyl)(3,4,5-trimethoxyphenyl) methane,
bis(4-diethylamino-o-tolyl)(p-hydroxyphenyl)methane,
bis(4-diethylamino-o-tolyl)(3-methylthienyl)methane.

The deactivating component of the photosensitive composition comprises a second photoactivatable oxidant and a reductant. The deactivating component is sometimes referred to as a "redox couple." Preferably the second photoactivatable oxidant is a quinone, e.g., pyrenequinone or phenanthrenequinone; and the reductant is a polyether, or a compound of the formula $N[CH_2)_nCOOR]_3$ wherein $n$ is the integer 1 or 2 and R is lower alkyl. Most preferably the deactivating components are a polynuclear quinone absorbing principally in the 430–550 m$\mu$ region such as 1,6-pyrenequinone, 1,8-pyrenequinone, 9,10-phenanthrenequinone and mixtures thereof, most preferably 9,10-phenanthrenequinone; while the reductant member is preferably a $C_1$ to $C_4$ alkyl ester of nitrilotriacetic acid or of 3,3′,3″-nitrilotripropionic acid, most preferably trimethyl nitrilotripropionate.

These deactivating components are responsive to visible light and preferably to light rich in wavelengths between 380 and 460 m$\mu$.

Thus compositions useful in the invention include these described in MacLachlan U.S. Pat. 3,390,996, issued July 2, 1968 which composition disclosure is incorporated herein by reference. Particularly preferred is the composition embodiment described in column 3, line 68 through column 4, line 2 of the patent wherein the color generator is an aminotriarylmethane containing at least two p-dialkylamino-substituted phenyl groups having as a substituent ortho to the methane carbon atom an alkyl, alkoxy or halogen, the first photoactivatable oxidant is a 2,2-(o-substituted phenyl)-4,4′,5,5′-tetraphenyl biimidazole, the second photoactivatible (the oxidant of said patent) oxidant redox couple is a quinone and the reductant component (of the redox couple of the patent) is a polyether. The ortho-substituents on the 2 and 2′-phenyl groups are preferably F, Cl, Br, alkyl, alkoxyl, or benzo. These preferred compositions and the components thereof are described in said patent in column 4, line 56 to column 5, line 4; column 8, lines 34 to 56; column 11, lines 11–19; and column 12, lines 21–23; each incorporated herein by reference.

The compositions useful herein also include those compositions described in Cescon U.S. Pat. 3,390,994, issued July 2, 1968 which composition disclosure is incorporated herein by reference. In particular the embodiment described in column 2, lines 51 through 64 is incorporated herein by reference. This embodiment consists essentially of an intimate admixture of (a) a salt of an acid and the leuco form of a triphenylmethane dye having, in at least two of the phenyl rings positioned para to the methane carbon atom, a $C_1$ to $C_4$ dialkyl amino substituent, (b) a 2,2′,4,4′,5,5′-hexaarylbiimidazole wherein the aryl groups are alike or different and preferably have an ortho substituent in the 2, and 2′-aryl groups selected from the group consisting of chlorine, bromine, fluorine, lower alkoxy, methyl, and benzo, and (c) a redox couple which consists of (1) a pyrenequinone or phenanthrenequinone as oxidant and (2) a compound having the general formula $N[(CH_2)_nCOOR]_3$, wherein $n$ is the integer 1 or 2 and R is a straight chain lower alkyl as reductant. Component (a) and (b) form the color generator portion of the photosensitive composition, while component (c) forms the deactivating portion of the composition. Representative specific components specifically incorporated by reference herein are those found in column 3, line 21 to column 5, line 37 of said patent.

The deactivating portion of the composition of the previous paragraph may be replaced by a mixture of 1,6- and 1,8-pyrenequinone (in amounts of .04 to .4 mole per mole of triimidazole), either 9,10-phenanthrenequinone, perinaphtenone, or 4-methoxy-1,2-naphthoquinone (in an amount of .04 to 2 moles per mole of triimidazole); and an ether containing at least one oxymethylene group wherein the methylene bears at least one hydrogen, e.g.

$$RO-(CH_2\underset{|}{\overset{(CH_2)_nR}{C}}H-O)_m-R$$

where $n$ is 0–1, $m$ is 1 to 15, R is hydrogen, alkyl, phenyl, alkylphenyl, biphenylyl or acyl, R′ is H when $n$ is zero and is H, OH or R when $n$ is 1.

A preferred photoimageable/photodeactivatable composition is:

(A) color-forming (imaging) components
- (1) a salt of a leuco triarylmethane and a salt forming acid; and
- (2) a hexaarylbiimidazole which absorbs principally in the ultraviolet region and is a photooxidant for the salt of the leuco triarylmethane; and (B) deactivating (image fixing) components
- (3) a second photooxidant (preferably a polynuclear quinone) which is activatable at longer wavelengths, e.g. visible light, than those required to activate the biimidazole, does not photooxidize leuco dye to dye, and is reducible in its photoactivated state to a second reductant; and
- (4) a first reductant (preferably an ether having abstractable hydrogen, an ester having abstractable hydrogen, a lower alkyl nitrilotriacetate or a lower alkyl 3,3′,3″-nitrilotripropionate) which is a reductant for the photoactivated second oxidant but is not a reductant for the photoactivated biimidazole, said first reductant reducing the photoactivated second oxidant to the second reductant, said second reductant being a reductant for the activated biimidazole whereby it prevents the color-forming reaction between the activated biimidazole and leuco dye.

The molar ratio of biimidazole photooxidant to aminotriarylmethane color-generator may vary from about 0.1:1 to about 10:1. The preferred range is from 1:1 to 2:1.

The quinone component of the redox couple is based on the biimidazole molar ratios of from 0.01:1 to 2:1 may be employed with ratios of 0.2:1 to 0.5:1 being preferred. The reductant component (e.g., trimethyl 3,3′,3″-nitrilotripropionate) of the redox couple (deactivating component) is employed in molar ratios of from about 1:1 to about 40:1 based on the quinone component.

Polymeric binders can be present in the photosensitive compositions to thicken them or adhere them to substrates. Binders can also serve as a matrix for the composition and the mixture can be cast, extruded or otherwise formed into unsupported imageable films. Light-transparent and film-forming polymers are preferred. Examples are ethyl cellulose, polyvinyl alcohol, polyvinyl chloride, polystyrene, polyvinyl acetate, poly-(methyl methacrylate), cellulose acetate, cellulose butyrate, cellulose acetate butyrate, cellulose nitrate, chlorinated rubber, co-polymers of the above vinyl monomers, and gelatin. Binder or matrix amounts vary from about 0.5 part to about 200 parts by weight per part of combined weight of leuco dye and hexaarylbiimidazole. In general, from 0.5 to 10 parts are used as adhesive or thickener, while higher amounts are used to form the unsupported films. With certain polymers, it may be desirable to add a plasticizer to give flexibility to the film or coating. Plasticizers include the polyethylene glycols such as the commercially available carbo-waxes, and related materials, such as substituted phenolethylene oxide adducts, for example the polyethers obtained from o-, m- and p-cresol, o-, m- and p-phenylphenol and p-nonylphenol, including commercially available materials such as the Igepal alkyl phenoxy polyoxyethylene ethanols. Other plasticizers are the acetates, propionates, butyrates and other carboxylate esters of ethylene glycol, diethylene-glycol, glycerol, pentaerythritol and other polyhydric alcohols, and the alkyl phthalates and phosphates such as dimethyl phthalate, diethyl phthalate, dioctyl phthalate, tributyl phosphate, trihexyl phosphate, trioctyl phosphate, triphenyl phosphate, tricresyl phosphate and cresyl diphenyl phosphate.

Alternate phototropes

Other phototropic compounds are operable in this invention. The principal requirement fulfilled by these compounds may be succinctly shown as follows:

$$\text{colorless state} \underset{\text{visible light}}{\overset{\text{UV light}}{\rightleftarrows}} \text{colored state}$$

Compounds obeying the above criteria are known in the art; however, their usefulness in the co-irradiation embodiment of this invention was not known heretofore. Illustrative of suitable compounds are the following:

(A) a phototrope having the general formula:

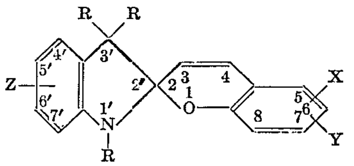

wherein X, Y and Z are the same or different monovalent radicals selected from among hydrogen, carboxyl (—COOH), alkoxy, nitro, hydroxyl, alkoxycarbonyl, cyano, halogen, amino, amido, alkylsulfone, arylsulfone, acyl and acylamido; and wherein the hydrocarbyl groups attached to functional moieties containing same have no more than 8 carbon atoms and preferably are alkyl radicals of 1 to 4 carbon atoms; at least one of said X, Y and Z substituents being other than hydrogen; and, as shown, the substituent Z being located in one of positions 4′ to 7′, inclusive, and the substituents X and Y being located at positions 5 to 8, inclusive; and R is a hydrocarbyl radical such as alkyl, cycloalkyl, alkenyl, aryl, alkaryl, and aralkyl, having more than 20 carbon atoms and preferably is an alkyl radical of 1 to 8 carbon atoms, as disclosed in U.S. 3,485,765.

Representative photographic spirobenzopyranindolines, useful in this invention, are listed in the above patent, column 3, line 4 through column 4, line 10. The preferred phototropes are those in which Z is hydrogen or an alkoxycarbonyl radical and X and Y are nitro groups, or a nitro group in combination with hydrogen, methoxy group or a halogen, or halogens.

(B) 3 - alkyl, 3' - methyl - spiro - [benzoxazole-2,2'-(2'H-1'-benzopyran)] having the structure

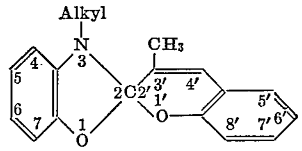

and their benzene-ring-substituted derivatives, as described in Brit. 889,186.

(C) 3 - alkyl, 3' - methyl - spiro - [benzothiazole-2,2'-(2'H-1'-benzopyran)], having the structure

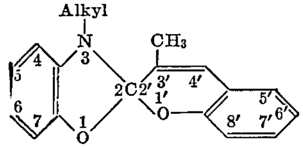

and the benzene-ring-substituted derivatives thereof, as described in Brit. 887,902.

(D) Derivatives of 3' - methyl - spiro(2H-1-betanaphthopyran-2,2'[2'H-1'-benzopyran]) having the structure

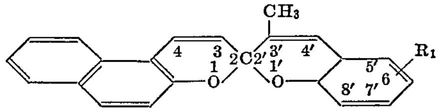

as described in U.S. 2,978,462; and derivatives of the compound 3-phenyl-spiro(2H - 1 - benzopyran - 2,2' - [2'H-1-benzopyran]) having the structure

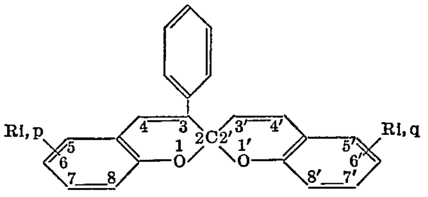

as described in U.S. 3,022,318, and (E) 2,3-diphenylindenone oxide,

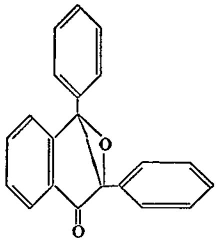

as described in "J. Am. Chem. Soc.," 88, 4942 (1966).

The medium in which the phototrope is dissolved can be liquid or solid. Liquid media which can be employed include, in general, any inert solvent and in particular such solvents as hydrocarbon solvents, halogenated hydrocarbon solvents, alcohols, esters, ketones, ethers, and the like. Preferably, however, the phototropic composition suitable for use in the present invention is employed in solution in a solid and more specifically in the form of a solution in a thermoplastic resin.

The concentration in which the phototrope is employed in the compositions of the present invention can vary widely and is best determined in accordance with the intended application, since the phototropic properties of a composition are not only affected by the particular phototrope employed, but also by the particular medium, as well as the concentration of the phototrope. In general, however, the phototropes are employed as relatively dilute solutions and concentrations within the range of 0.001 to 10% by weight of the medium are satisfactory for most applications.

As indicated hereinabove, the phototrope is preferably incorporated into plastic compositions. Suitable thermoplastic resins include cellulose esters such as cellulose acetate butyrate; polyolefins such as polyethylene, polypropylene and copolymers of ethylene with vinyl esters or acrylic esters; polyvinyl halides such as polyvinyl chloride, and polyvinylidene chloride; polystyrene and styrene copolymers with butadiene and/or acrylonitrile; acrylic resins such as polymethylmethacrylate; polyvinyl acetals such as polyvinyl butyral; polyvinyl alcohol; polyvinyl esters such as polyvinyl acetate, and polyesters such as polyethylene terephthalate. Particularly preferred thermoplastic resins are plasticized and unplasticized cellulose ester resins.

Various means heretofore employed for the compounding of additives with thermoplastic resins can also be employed for the phototropic compositions of the present invention. Such methods include the solution of resin and phototropic composition in a common solvent followed by mixing and evaporation of the solvent, although, preferably, the resin is heated to a sufficiently fluid state above its softening point and then directly admixed with the phototropic composition. Rubber mills, Banbury mixers, and screw extruders are employed in such methods. Care should, of course, be taken that the temperatures employed do not cause the degradation of the components of the mixture. More than one phototrope can be compounded using the above-indicated media or media which are mixtures of solvents, thermoplastic resins, or thermoplastic resins and solvents.

This embodiment of the invention also includes the incorporation of modifiers as, for example, taught by U.S. 3,485,765, sensitizers as, for example, taught by U.S. 3,486,899, and means for making the images permanent by treatment with sulfur dioxide, or other chemical agents, or in other cases, by simple pressure application to rupture the solvent-containing capsules in materials that require the presence of solvent to permit the two light-induced reactions to proceed. The compositions useful for preparing a stable colored state described by Netherlands 6903746 can also be employed.

Substrates

For imaging according to this invention, the compositions can be coated upon or impregnated in substrates following known techniques. Substrates include materials commonly used in the graphic arts and in decorative applications such as paper ranging from tissue paper to heavy cardboard, films of plastics and polymeric materials such as regenerated cellulose, cellulose acetate, cellulose nitrate, polyester of glycol and terephthalic acid, vinyl polymers and co-polymers, polyethylene, polyvinylacetate, polymethyl methacrylate, polyvinylchloride; textile fabrics; glass; wood; and metals. The composition, usually as a solution in a carrier solvent described above, can be sprayed, brushed, applied by a roller or an immersion coater, flowed over the surface, picked up by immersion or spread by other means, and the solvent evaporated. In general, solvents are employed which are volatizing at ordinary pressures. Examples are amides such as N,N-dimethylformamide and N,N-dimethylacetamide; alcohols and ether alcohols such as methanol, ethanol, 1-propanol, 2-propanol, butanol, and ethylene glycol; esters such as methyl acetate and ethyl acetate; aromatics such as benzene, o-dichlorobenzene and toluene; ketones such as acetone, methyl ethyl ketone and 3-pentanone; aliphatic halocarbons such as methylene chloride, chloroform, 1,1,2-trichloroethane, 1,1,2,2-tetrachloroethane and 1,1,2-trichloroethethylene; miscellaneous solvents such as dimethylsulfoxide, pyridine, tetrahydrofuran; dioxane, dicyanocyclobutane and 1-methyl-2- oxohexamethyleneimine; and mixtures of these solvents in various proportions as may be required to attain solutions. It is often beneficial to leave a small residue of solvent in the dried composition so that the desired degree of imaging can be obtained upon subsequent irradiation. Ordinary drying such as that employed in paper manufacture or in film casting results in the retention of ample solvent to give a composition with good photosensitivity. The compositions so produced are dry to the touch and stable to storage at room temperature. Indeed, moisture of the air is absorbed by many of the compositions, particularly those comprising an acid salt of an amino leuco form of a dye on cellulosic substrates, and serves as a suitable solvent.

EXAMPLES

The invention, various embodiments thereof, and the advantages it provides are further illustrated by the examples below.

EXAMPLE 1

The photosensitive paper utilized below was obtained as follows:

A coating composition was prepared from the following ingredients:

| | | |
|---|---|---|
| Acetone | ml | 54 |
| 2-propanol | ml | 6 |
| 2,2′-bis(o-chlorophenyl)-4,4′,5,5′-tetrakis(m-methoxyphenyl)biimidazole ($5.36\times10^{-4}$ mole) | g | 0.4180 |
| Tris(4-diethylamino-o-tolyl)methane ($1.8\times10^{-5}$ mole) | g | 0.0900 |
| p-Toluenesulfonic acid monohydrate ($2.1\times10^{-3}$ mole) | g | 0.400 |
| Trimethyl 3,3′,3″-nitrilotripropionate ($4.2\times10^{-3}$ mole) | ml | 1.0 |
| 9,10-phenanthrenequinone ($2.6\times10^{-4}$ mole) | g | 0.054 |
| Cellulose acetate butyrate (thermoplastic binder, employed as Eastman EAB-171-40) | g | 6.0 |
| Polyethyleneoxide adduct of o-phenylphenol prepared from 2.25 moles of ethylene oxide per mole of the phenol and having the average formula $C_6H_5—C_6H_4—O(CH_2CH_2O)_{2.25}H$ | g | 3.0 |

A high holdout calendered bleached sulfite paper was coated with the above composition. The paper was dried under hot forced air to a non-tacky surface.

A blowback system was constructed substantially as illustrated in FIGS. 1 to 3 using a 35 mm. projector, an ordinary viewing screen and a blacklite blue fluorescent (low intensity ultraviolet) lamp. The color temperature of projector lamp was 3200° K. at the source and provided white light at 800 foot candles of illumination at the screen at a screen to lamp distance affording a 10× enlargement of a 35 mm. slide image (silver on polyester film base). The ultraviolet lamp was positioned outside the projected lamp light beam and directed so as to irradiate the screen over the projected lamp light area with an irradiance of 0.2 milliwatt/cm.² at the screen surface.

To demonstrate the method of this invention, a sheet of photosensitive paper, described above, was placed over the screen, with the projector and blacklite lamps off. Both lamps were then turned on at the same time for 30 seconds, then turned off. The thus exposed paper showed a blue image having a reflectance optical density of 0.37 against a pale yellow background having a reflectance optical density of 0.15. The contrast between the colored and background areas was judged good. The pale yellow background, which is resistant to ambient light induced color formation and which owes its yellow cast to the presence of phenanthrenequinone in the photosensitive position, gradually bleaches to white on further exposure to roomlight, daylight or sunlight.

In comparison, when the same (unexposed) paper was subjected to the same exposure but sequentially, first with the projector lamp for 30 seconds, followed by an overall irradiation with the ultraviolet light for another 30 seconds, the resulting image optical density was 0.32 (somewhat lower), the background optical density 0.19 (significantly higher), and the contrast was only fair (inferior).

EXAMPLE 2

Example 1 was repeated with a 16 mm. microfilm projector having a *f*1.6 lens with a 1.5 inch focal length and fitted with a General Electric 200-watt EJL lamp and two 0.25 inch thick sheets of heat-absorbing glass. The visible light transmitted through the transparent regions of the microfilm provided 700 foot candles at the imaging plane of the screen, which was distanced for a 21 times enlargement. Each of two blacklite blue lamps was positioned just outside the imagewise projected visible beam and directed so as to irradiate the entire imaging plane with ultraviolet light at an irradiance at the plane of 0.28 millwatt/cm².

Samples of photosensitive paper described in Example 1 were co-irradiated for different times as noted below. The results are expressed below as the reflectance optical densities of the blue imaged area (struck by UV only) and the background area (co-struck, deactivated).

CO-IRRADIATION FOR 21× HARD COPY BLOWBACK

[0.28 mw./cm.² ultraviolet 700 foot candles visible]

| Time, seconds | OD image | OD background | Δ OD |
|---|---|---|---|
| 5 | 0.12 | 0.08 | 0.04 |
| 10 | 0.20 | 0.09 | 0.11 |
| 15 | 0.29 | 0.09 | 0.20 |
| 20 | 0.34 | 0.10 | 0.24 |
| 25 | 0.41 | 0.11 | 0.30 |
| 30 | 0.47 | 0.13 | 0.34 |
| 40 | 0.56 | 0.13 | 0.43 |
| 50 | 0.63 | 0.15 | 0.48 |
| 60 | 0.68 | 0.16 | 0.52 |
| 120 | 0.83 | 0.19 | 0.64 |

The results show that while the optical density of the blue image increases with increasing exposure, that of the co-struck area increases to a much lesser extent. In fact, as the background optical densities indicate, little or no color due to blue dye formation occurred in the presence of the visible light.

That the above co-irradiated papers are to a large practical extent deactivated against color formation on exposure to stray ultraviolet light can be shown on prolonged exposure to roomlight, daylight and sunlight.

EXAMPLE 3

High quality imaged and fixed hard copy is also obtained under the above co-irradiation conditions on employing a photosensitive paper prepared as described in Example 1 but modified as follows:

The quantity of the 2,2′-bis(o-chlorophenyl)-4,4′,5,5′-tetrakis(m-methoxy-phenyl)biimidazole was decreased to 0.334 gram (a 20% decrease), that of the 9,10-phenanthrenequinone increased to 0.065 grams (a 20% increase).

With this composition there is a reduced amount of color formation in the background areas co-struck under the described exposures.

EXAMPLE 4

A microfilm blowback device was constructed as illustrated in FIGS. 2, 3 and 4. A 16 mm. microfilm projector was fitted with a 300 arc type lamp emitting over the near ultraviolet and visible regions of the spectrum; a Corning C.S. 5-57 filter (a band pass filter, which passes light over the range 360 to 500 mμ with peaking at 420 mμ) was immersed in a water-filled cell and placed between the lamp and the film gate. The projector was adjusted to project a 21.3 enlargement onto a suitably placed near white viewing screen. Projected with the filtered light the film's silver-on-polyester image appeared on the viewing screen as black on a bright blue field, having a phototropic illumination reading of approximately 500-600 foot candles, the image being pleasing to the eye and clearly discernible under ordinary room lighting conditions. Two banks of tubular blacklite blue fluorescent lamps with reflectors (4 tubes in each bank) were positioned on opposite sides of the viewing screen, just outside the projected light beam, about 5 inches from the screen and directed to completely overlap the projected lamp light area with ultraviolet light, the total ultraviolet radiation being about 1 mw./cm.$^2$.

With the projector and the fluorescent lamps off, a sheet of photosensitive paper of Example 1 was placed over the projected area of the screen. Simultaneously, the projector lamp and the fluorescent lamps were turned on, then after 10 seconds, turned off. The thus exposed paper now bore a 21.3 times enlargement of the microfilm image as a clear blue image (corresponding to colored area 8 of FIGS. 1 and 3) on a pale yellow deactivated background (corresponding to co-struck area 7 of (FIGS. 1 and 3).

In comparison with the results obtained in the above exemplified method of the invention, when another sample of the same photosensitive paper was imaged and fixed sequentially, by first exposing it to the projected lamp light for 10 seconds to form a "latent" image, followed by an overall exposure to the ultraviolet light from the same fluorescent lamps to develop the image to the same optical density, the resulting image was clearly readable, but the deactivated background was noticeably more colored (bluish) and the contrast between the colored and deactivated areas was diminished.

EXAMPLE 5

The apparatus and general procedure of Example 4 was employed to co-irradiate photosensitive paper described in Example 1. The exposure conditions and the results, along with comparative data obtained by sequential irradiation under the same conditions, are given below.

CO-IRRADIATION FOR 21X HARD COPY BLOWBACK

[Visible light, 600 foot candles; ultraviolet light, as below; exposure time, as below]

| Run | Mode of Irradiation | UV, M.W./cm.$^2$ | Time, sec. | OD image | OD back-ground | Δ OD |
|---|---|---|---|---|---|---|
| 1 | Co- | 2.0 | 10 | 0.84 | 0.40 | 0.44 |
| | Sequential | 2.0 | 10 | 0.85 | 0.58 | 0.27 |
| 2 | Co- | 1.5 | 5 | 0.34 | 0.02 | 0.32 |
| | Sequential | 1.5 | 5 | 0.31 | 0.01 | 0.30 |
| 3 | Co- | 1.5 | 10 | 0.64 | 0.11 | 0.53 |
| | Sequential | 1.5 | 10 | 0.64 | 0.30 | 0.34 |
| 4 | Co- | 1.5 | 15 | 0.77 | 0.12 | 0.65 |
| | Sequential | 1.5 | 15 | 0.78 | 0.41 | 0.37 |
| 5 | Co- | 1.25 | 10 | 0.64 | 0.06 | 0.58 |
| | Sequential | 1.25 | 10 | 0.63 | 0.22 | 0.41 |
| 6 | Co- | 0.76 | 20 | 0.61 | 0.03 | 0.58 |
| | Sequential | 0.76 | 20 | 0.60 | 0.05 | 0.55 |
| 7 | Co- | 0.76 | 30 | 0.71 | 0.01 | 0.70 |
| | Sequeutial | 0.76 | 30 | 0.71 | 0.18 | 0.53 |
| 8 | Co- | 0.76 | 40 | 0.80 | 0.02 | 0.78 |
| | Sequential | 0.76 | 40 | 0.78 | 0.28 | 0.50 |

The results show that co-irradiation produces less background color with better contrast (greater ΔOD) than sequential irradiation; and that hard copy access time can be materially decreased (effectively halved) by applying the color-inducing and the deactivating radiations at the same time.

EXAMPLE 6

Example 5 was repeated using a photosensitive paper described below and exposure conditions as tabulated below:

| Run | Irradiation | UV intensity, M.W./c.m.$^2$ | Time, sec. | OD image | OD back-ground | Δ OD |
|---|---|---|---|---|---|---|
| 1 | Co- | 0.75 | 10 | 0.47 | 0.20 | 0.27 |
| | Sequential | 0.75 | 10 | 0.43 | 0.20 | 0.23 |
| 2 | Co- | 0.50 | 10 | 0.27 | 0.04 | 0.23 |
| | Sequential | 0.50 | 10 | 0.21 | 0.05 | 10.16 |
| 3 | Co- | 0.50 | 30 | 0.61 | 0.10 | 0.51 |
| | Sequential | 0.50 | 30 | 0.68 | 0.21 | 0.47 |
| 4 | Co- | 0.57 | 60 | 0.85 | 0.25 | 0.60 |
| | Sequential | 0.57 | 60 | 0.87 | 0.37 | 0.50 |

The photosensitive paper was prepared from the following coating composition:

| Ingredients | Parts | Molar proportions |
|---|---|---|
| Acetone | 46.0 | ---------- |
| Cellulose acetate butyrate (Eastman EAB 171–40) | 6.0 | ---------- |
| p-Nonylphenol-ethylene oxide adduct, $C_9H_{19}C_6H_4O(CH_2CH_2O)_{1.5}H$ | 4.0 | 92 |
| Tris(p-diethylaminoethyl-o-tolyl) methane | 0.300 | 0.75 |
| p-Toluenesulfonic acid monohydrate | 0.344 | 2.25 |
| 2,2′-bis(o-chlorophenyl)-4,4′,5,5′-tetrakis(m-methoxyphenyl)-biimidazole | 0.624 | 1.00 |
| 1,6- and 1,8-pyrenequinones, added as a 1:1 mixture | 0.0371 | 0.2 |
| 9,10-phenanthrenequinone | 0.0664 | 0.4 |

The solution was applied to bleached-sulfite roll stock paper and the acetone allowed to evaporate to give a coating about 0.4 mil thick.

EXAMPLE 7

To illustrate the versatility of the invention method and of the viewer-printer described in FIG. 4. The above exemplified image-fix system is modified to contain a 5 inch wide roll of the photosensitive paper, a means for feeding the roll stock over the face of the viewing screen, a means for cutting the roll stock into 5 inch square sheets, and a means for recovering the co-irradiated (hard copy) paper from the viewer-printer.

With no paper being fed into the projected area of the viewing screen, the projector lamp is turned on to project onto the screen a black image on a bright blue background, 21.3 times enlarged. This pre-printing viewing enables the viewer to observe the quality and positioning of the image to be copied and to make adjustments if necessary before printing. To print out the image as hard copy, the fluorescent lamps are turned on and simultaneously the roll stock feed is started, feeding the photosensitive paper at a rate of 12 inches/sec. and placing a sheet of the paper between the screen and the projected lamp light area in about 1 second. After a 10-second exposure, the sheet is recovered as hard copy showing a sharp blue image on a clear deactivated background.

EXAMPLE 8

Good quality readable hard copy—as a 21.3 times enlarged black image on a pale yellow background—is likewise obtained on repeating Example 4 with a photosensitive paper prepared from a coating composition which contains the same ingredients described in Example 1 except that the 0.0900 gram of tris(4-diethylamino-o-tolyl)methane is replaced by 0.1706 gram of bis(4-diethylamino-o-tolyl)-3,4-dimethoxyphenyl methane.

EXAMPLE 9

Readable hard copy blowback is also obtained on employing the conditions of Example 5 to image and fix a photosensitive paper obtained by coating a paper substrate with the following solution and evaporating the carrier solvent:

| Ingredients: | Parts by weight |
|---|---|
| Acetone | 41.4 |
| 2-propanol | 4.6 |
| Cellulose acetate butyrate (Eastman EAB–171–40) | 6.0 |
| p-$C_9H_{19}$-$H_4$-$O(CH_2CH_2O)_{1.5}H$ (plasticizer, obtained by condensing p-nonylphenyl with 1.5 moles of ethylene oxide) | 4.0 |
| Tris(4-diethylamine-o-tolyl)methane | 0.30 |
| 2,2′-bis(o-chlorophenyl)-4,4′,5,5′-tetrakis (m-methoxyphenyl)biimidazole | 0.62 |
| p-Toluenesulfonic acid monohydrate | 0.34 |
| An approx. 1:1 mixture of 1,6- and 1,8-pyrenequinone | 0.37 |

EXAMPLE 10

Readable hard copy is also obtained on repeating Example 4 with a photosensitive paper prepared by coating a paper substrate with the following solution and evaporating the solvent:

| Ingredients: | Parts by weight |
|---|---|
| Acetone | 48 |
| Cellulose acetate butyrate (Eastman EAB-531-1) | 6 |
| o-$C_6H_5$-$C_6H_4$-$O(CH_2CH_2O)_{2.3}H$ (prepared by condensing o-phenyl phenol with 2.3 moles of ethylene oxide) | 5.5 |
| Bis(p-diethylamino-o-tolyl)3,4-dimethoxyphenyl methane | 0.190 |
| Bis(p-diethylamino-o-tolyl)phenyl methane | 0.207 |
| 2,2′-bis(o-chlorophenyl)-4,4′,5,5′-tetrakis (m-methoxyphenyl)biimidazole | 0.780 |
| p-Toluenesulfonic acid monohydrate | 0.342 |
| 9,10-phenanthrenequinone | 0.125 |

EXAMPLE 11

Similar results are also obtained on repeating Example 1 with the same photosensitive formulation coated on a polyester film base.

EXAMPLE 12

The photosensitive paper utilized below was obtained as follows:

A coating composition was prepared from the following ingredients:

| | | |
|---|---|---|
| Acetone | ml | 60 |
| 1′,3′,3′-trimethyl - 6 - nitrospiro(2H-1-benzopyran-2,2′-indoline) prepared according to U.S. Pat. 3,485,765 | g | 0.1 |
| Cellulose acetate butyrate (Eastman EAB-381-20) | g | 6.0 |
| N-ethyl-p-toluenesulfonamide (Monsanto Chemical Company's Santicizer-3) | g | 2.0 |

A high holdout calendered bleached sulfite paper was coated with the above composition. The paper was dried under hot forced air to a non-tacky surface. After drying, there was obtained a light pink paper, which could be readily bleached by exposure to ambient visible light.

Readable hard copy (positive image) was obtained on repeating Example 4 with the above photosensitive paper; a magenta image on a pink background was obtained.

EXAMPLE 13

Similar results to those of Example 12 were obtained on substituting for the spiran of Example 12 an equimolar amount of 2,3-diphenyl-1-indenone oxide, prepared as reported by Ullman, "J. Am. Chem. Soc.," 88, 4942 (1966). A magenta image on a pink background was obtained under normal blow-back conditions by following the procedure of Example 4.

The preceding representative examples can be varied in accordance with the scope of the total disclosure above, as understood and practiced by one skilled in the art, to achieve essentially the same results.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A process for creating a positive colored image on a composition photosensitive directly upon exposure to two different radiations, which composition comprises:

(A) a composition which is responsive to two different wavelength ranges, producing, on being exposed to radiation of the first wavelength range, a first colored state and producing on exposure to radiation of the second wavelength range a second colored state, said composition being further characterized in that it can be prevented from forming color on being simultaneously exposed to radiations within both wavelength ranges; said composition being selected from the group consisting of a phototropic spiropyran, a phototropic indenone oxide, and an admixture of (B) a color-forming component comprising (1) an essentially colorless oxidizable nitrogen-containing organic color-generator and (2) a photoactivatable first oxidant which can oxidize the color generator to a colored compound on irradiating the said first oxidant with light of a first wavelength range, and (B′) a deactivating component comprising (1) a second photoactivatable oxidant which is activatable by light on a second wavelength range, is not an oxidant for the color generator but is reducible when activated by light of said second wavelength range, and (2) a reductant which is a reductant for the second oxidant but not for the first oxidant, said reductant being capable of reducing the second oxidant on irradiation by light of said second wavelength range to a second reductant which is a reductant for the photoactivated first oxidant, whereby the second reductant prevents the color forming reaction between the color generator and the first oxidant;

said process comprising simultaneously exposing said composition disposed on an image-capture surface to radiation of the first and the second wavelength ranges, said radiation of the first wavelength range being directed to the entire surface to be radiated and being of an intensity effective to cause color formation in areas of said surface other than co-irradiated areas but ineffective to cause color formation in areas of said surface that are co-irradiated with the radiation of the second wavelength range; and said radiation of the second wavelength range being directed patternwise to said surface to be radiated according to the image to be captured, and being of an intensity effective to prevent color formation in areas of said surface that are subjected to said second radiation.

2. The process of claim 1 wherein the color generator of the composition is a leuco dye, the first oxidant of the composition is a 2,2′,4,4′,5,5′-hexaarylbiimidazole, the second oxidant of the composition is a quinone, and the reductant of the composition is a polyether or a compound of the formula $N[(CH_2)_nCOOR]_3$ wherein $n$ is the integer 1 or 2 and R is lower alkyl.

3. The process of claim 2 wherein the light of the first wavelength range is ultraviolet light and the light of the second wavelength range is visible light.

4. The process of claim 1 wherein, the color generator of the composition is a salt of a salt-forming acid and a leuco triarylmethane wherein at least two of the aryl groups are phenyl groups having (a) an $R_1R_2N$-substituent in the position para to the bond to the methane carbon atom wherein $R_1$ and $R_2$ are each groups selected from hydrogen, $C_1$ to $C_{10}$ alkyl, 2-hydroxyethyl, 2-cyanoethyl, benzyl or phenyl, and (b) a group ortho to the bond to the methane carbon atom which is selected from lower alkyl, lower alkoxy, fluorine, chlorine, bromine, or butadienylene which when joined to the phenyl group forms a naphthalene ring; and the third aryl group, when different from the first two, is selected from thienyl, furyl, oxazylyl, pyridyl, thiazolyl, indolyl, indolinyl, benzoxazolyl, quinolyl, benzothiazolyl, phenyl, naphthyl, or such aforelisted groups substituted with lower alkyl, lower alkoxyl, methylenedioxy, fluoro, chloro, bromo, amino, lower alkylamino, lower dialkylamino, lower alkylthio, hydroxy, carboxy, carbonamido, lower carbalkoxy, lower alkylsulfonyl, lower alkylsulfonamido, $C_6$ to $C_{10}$ arylsulfonamido, nitro or benzylthio;

the first oxidant of the composition is a 2,2',4,4',5,5'-hexaphenylbiimidazole wherein the 2 and 2' phenyl groups bear an ortho substituent selected from fluorine, chlorine, bromine, methyl and methoxy; and wherein the 4,4',5 and 5' phenyl groups are either unsubstituted or are each substituted with one lower alkoxy group;

the second oxidant of the composition is selected from 1,6-pyrenequinone, 1,8-pyrenequinone, 9,10-phenanthrenequinone, or mixtures thereof; and the reductant is a compound of the formula $$N[(CH_2)_nCOOR]_3$$

wherein $n$ and R are defined as in claim 2.

5. The process of claim 4 wherein the light of the first wavelength range contains a predominance of wavelengths between about 255 and 375 mμ, and wherein the light of the second wavelength range contains a predominance of wavelengths between about 380 and 460 mμ.

6. The process of claim 1 wherein the pattern of light of the second wavelength range is obtained by passing it through a positive or negative image-bearing film.

7. The process of claim 6 wherein said pattern of the light of the second wavelength range is projected onto the image-capture surface.

8. The process of claim 6 wherein the image-bearing film is transparent to light of the first wavelength range and said image-capture surface is simultaneously irradiated by passing light of the first and second wavelength range through the film.

References Cited

UNITED STATES PATENTS

| | | | |
|---|---|---|---|
| 3,476,562 | 11/1969 | Yamada et al. | 96—90 |
| 3,414,410 | 12/1968 | Bartlett et al. | 96—27 |
| 3,597,079 | 8/1971 | Celi | 96—27 E |
| 3,445,233 | 5/1969 | Cescon | 96—48 |
| 3,390,994 | 7/1968 | Cescon | 96—48 |
| 3,390,996 | 7/1968 | MacLachlan | 96—48 |

NORMAN G. TORCHIN, Primary Examiner

W. H. LOUIE, Jr., Assistant Examiner

U.S. Cl. X.R.

96—90, 90 PC, 27 R, 27 E